United States Patent
Chen

(10) Patent No.: US 6,928,979 B2
(45) Date of Patent: Aug. 16, 2005

(54) GAS-ECONOMIZING POWERFUL ENGINE SPEED INCREASER

(75) Inventor: Yung-Tsung Chen, Tainan (TW)

(73) Assignee: Jung-Pin Cho, Tainan (TW)

( * ) Notice: Subject to any disclaimer, the term of this patent is extended or adjusted under 35 U.S.C. 154(b) by 113 days.

(21) Appl. No.: 10/705,383

(22) Filed: Nov. 10, 2003

(65) Prior Publication Data

US 2005/0098147 A1 May 12, 2005

(51) Int. Cl.⁷ .............................................. F02B 31/00
(52) U.S. Cl. ...................................................... 123/306
(58) Field of Search ................................. 123/306, 308, 123/184.21, 184.22, 184.46, 184.55

(56) References Cited

U.S. PATENT DOCUMENTS

| | | | | |
|---|---|---|---|---|
| 1,345,791 A | * | 7/1920 | Livingstone | 48/189.4 |
| 6,041,753 A | * | 3/2000 | Lin et al. | 123/306 |
| 6,158,412 A | * | 12/2000 | Kim | 123/306 |
| 6,550,446 B1 | * | 4/2003 | Robley, Jr. | 123/306 |
| 6,748,921 B1 | * | 6/2004 | Surges | 123/306 |
| 6,837,213 B1 | * | 1/2005 | Burnett | 123/306 |

* cited by examiner

Primary Examiner—Bibhu Mohanty
(74) Attorney, Agent, or Firm—Pro-Techtor International Services

(57) ABSTRACT

A gas-economizing powerful engine speed increaser is made integral, and positioned fixedly in an air intake tube connected with the front end of an air intake manifold of an engine. The engine speed increaser consists of an outer circular tube, an inner circular tube of a shorter diameter than that of the outer tube and positioned in the center of the outer tube, and a plurality of twisted leaves positioned spaced apart equidistantly between the outer tube and the inner tube. Air sucked in an air intake tube by the engine started and under operation flows through the engine speed increaser to become swirl wind by the twisted leaves and partly straight wind flowing swiftly through the center hollow of the inner tube and then enter the combustion room of the engine.

2 Claims, 2 Drawing Sheets

GAS-ECONOMIZING POWERFUL ENGINE SPEED INCREASER

BACKGROUND OF THE INVENTION

1. Field of the Invention

This invention relates to a gas-economizing powerful engine speed increaser, particularly to one positioned in an air intake tube connected with the front end of an air intake manifold of an engine for guiding and altering air current sucked in by the engine started into a swirl wind consisting of an circumferential swirling wind and a center straight wind, which flow swiftly in an engine combustion room and mix with gasoline and is then vaporized to become micro ions to be burned more quickly, reinforcing horsepower of the engine, economizing gasoline and lowering waste gas pollution.

2. Description of the Prior Art

A conventional carburetor and a conventional engine generally consumes large amount of gasoline, produces not enough horsepower, liable not to ignite, and often let its fuel route clogged. Then the carburetor should be taken off, cleaned, adjusted and maintained so as to function as usual, and a sparkplug has often to be replaced with a new one, or the engine may not be started. However, nowadays, new automobiles mostly have a jet engine associated with an IC computer to automate a car, impossible to be adjusted. So should a disorder happen, waste gas may be more polluted. In order to cope with such disorders, people frequently resort to advance lubricant added in gasoline in a gas tank for enhancing horsepower of a car, and decarbonizer to clean the fuel route to achieve complete combustion of gasoline. The expenditure for those can be a substantive burden to motorists.

Besides, in starting of an engine, air sucked in the air intake tube is a straight current possible to be hampered by the curvature of the air intake tube, and in continual operation of the engine, air pressure may be produced in the engine room, resist gas exhaustion, and collide with the straight wind coming from the air intake tube to become turbulence so that the engine cannot completely perform its best function, resulting in using excessive gasoline, producing less horsepower and more polluting waste gas.

Moreover, in order to reinforce the horsepower and lower waste gas volume, a conventional turbocharger (24) shown in FIG. 5 has been disclosed and been used, provided between the outlet of an intake manifest 25 of an engine and an exhaust pipe 26 and between a gas intake tube 22 and an air filter net 23. Thus fans in the turbocharger 24 may be rotated to increase the speed of air sucked in, utilizing waste gas to move the straight current in the air intake tube 22. But it may not effectively increase the air speed unless the rotating speed reaches 2500–3000 rpm. Or the fans may become obstacles to the straight wind. Further, this conventional turbocharger is rather complicated to cost high, with the fans becoming useless after a long term of use owing to increasing friction coefficient.

SUMMARY OF THE INVENTION

The objective of the invention is to offer a gas-economizing powerful engine speed increaser, to be used instead of the conventional turbocharger, possible to produce swirl wind, to let gasoline in an engine mix with air swiftly, augmenting speed of combustion process in the engine so that gasoline may completely burn up to reinforce its horsepower, economizing gasoline, and lowering waste gas volume.

The feature of the invention is an engine speed increaser consisting of an outer hollow circular tube to be fixed in an air intake tube, an inner hollow circular tube having an outer diameter shorter than the inner diameter of the outer circular tube, and a plurality of twisted leaves positioned spaced apart equidistantly between the outer circular tube and the inner circular tube and having the twisted angle being preferably 45 degrees or so.

BRIEF DESCRIPTION OF DRAWINGS

This invention will be better understood by referring to the accompanying drawings, wherein.

DETAILED DESCRIPTION OF THE PREFERRED EMBODIMENT

Figure 3:
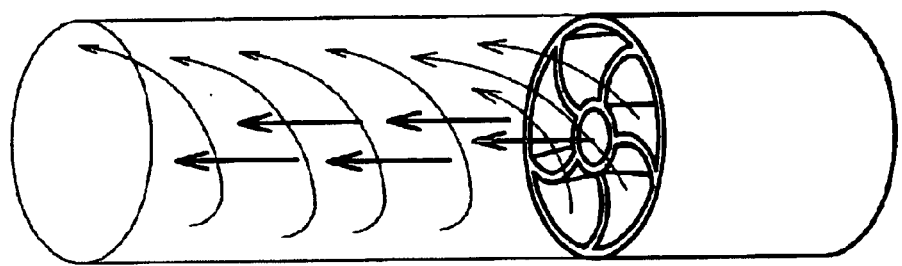
FIG. 3 is a perspective view of swirl wind produced by the engine speed increaser in the present invention.
Figure 2:
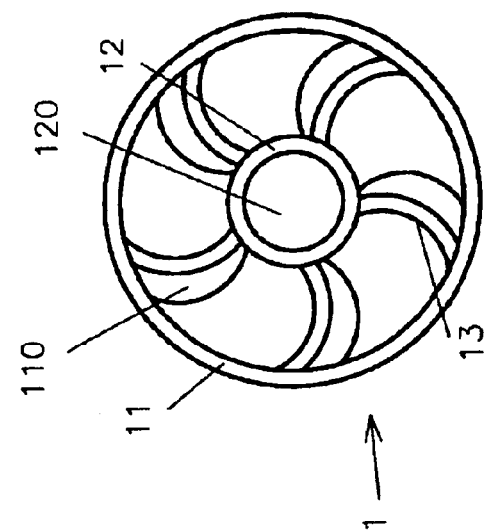
FIG. 2 is an upper view of the gas-economizing power engine speed increaser in the present invention.
Figure 1:
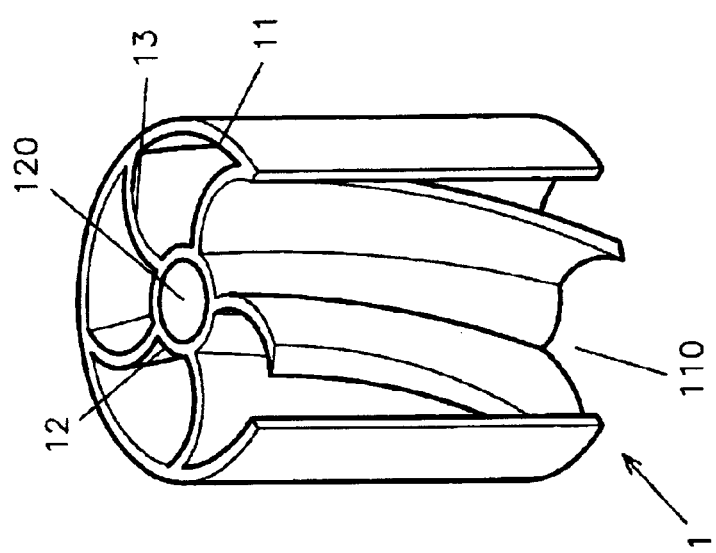
FIG. 1 is a perspective view of a gas-economizing powerful engine speed increaser in the present invention.

A preferred embodiment of a gas-economizing powerful engine speed increaser 1 in the present invention, as shown in FIGS. 1, 2 and 3, includes an outer circular tube 11 with a hollow interior 110, an inner circular tube 12 with a hollow interior 120 positioned in the center of the outer circular tube 11, and a plurality of twisted leaves 13 positioned spaced apart equidistantly between the outer circular tube 11 and the inner circular tube 12. The twisted leaves 13 are twisted to have 45 degrees or so.

Figure 5:
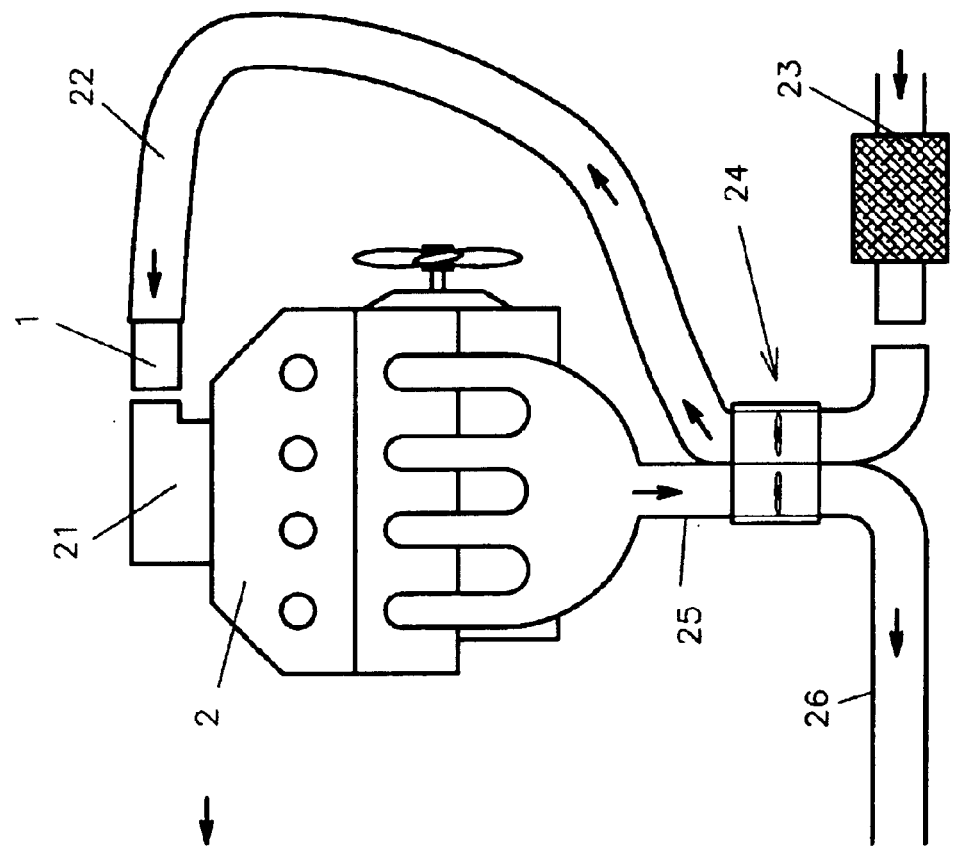
Figure 4:
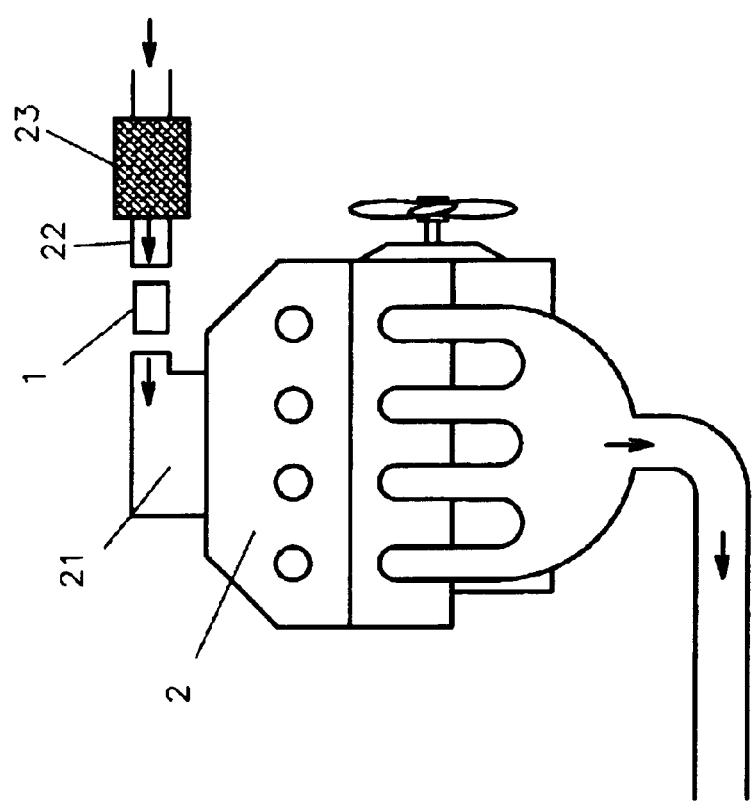
FIG. 4 is a concise view of the gas-economizing powerful engine speed increaser combined with an air intake tube; and, FIG. 5 is a concise view of the location of the gas-economizing power engine speed increaser combined with an air intake tube fixed with a turbocharger.

Then the engine speed increaser 1 is positioned fixedly in an air intake tube 22 between an air intake manifold 21 of an engine 2 and an air filter net 23 as shown in FIG. 4, or positioned fixedly in an air intake tube 22 between an air intake tube 21 of an engine 2 and a turbocharger 24 as shown in FIG. 5.

Then air sucked in the engine in starting and under operation are straight wind, and may be guided and changed into swirl wind in passing through the curved leaves 13 in the engine speed increaser 1 and partial straight wind passing through the hollow interior 120 of the inner tube 12 as shown in FIG. 3. Then this swirl wind plus straight wind flows into the combustion room of the engine 2 swiftly, mixes with gasoline, is vaporized into micro ions, and burns more swiftly and completely. Therefore, the engine 2 produces explosive force to reinforce its horsepower, reducing accumulated carbon in the combustion room, wear and tear, saving fuel, and lowering air pollution. In this way, this engine speed increaser can be applied to any engine, so long as it has an air intake tube 22.

While the preferred embodiment of the invention has been described above, it will be recognized and understood that various modifications may be made therein and the appended claims are intended to cover all such modifications that may fall within the spirit and scope of the invention.

What is claimed is:

1. A gas-economizing powerful engine speed increaser formed integral, positioned fixedly in an air intake tube connected with a front end of an air intake manifold of an engine, said engine speed increaser consisting of:

an outer hollow circular tube to be fixed firmly in said air intake tube;

an inner hollow circular tube fixed in a center portion of said outer hollow circular tube and having an outer diameter shorter than an inner diameter of said outer hollow circular tube;

a plurality of twisted leaves positioned spaced apart equidistantly between said outer circular tube and said inner circular tube; wherein air sucked in an engine started and under operation and flowing through said air intake tube to become straight wind, said straight wind becoming a swirl wind by means of said twisted leaves and partly passing swiftly through the hollow interior of said inner circular tube as straight wind after flowing through said engine speed increaser, said swirl wind plus straight wind flowing into the combustion room of said engine.

2. The gas economizing powerful engine speed increaser as claimed in claim 1, wherein said twisted leaves all preferably have angles of 45 degrees or so.

* * * * *